US009864783B1

(12) United States Patent
Mittleman

(10) Patent No.: US 9,864,783 B1
(45) Date of Patent: Jan. 9, 2018

(54) SYSTEMS AND METHODS FOR IDENTIFYING OUTLYING POINT OF INTEREST SEARCH RESULTS

(71) Applicant: Google Inc., Mountain View, CA (US)

(72) Inventor: Jessa Deborah Mittleman, Croton on Hudson, NY (US)

(73) Assignee: Google LLC, Mountain View, CA (US)

( * ) Notice: Subject to any disclaimer, the term of this patent is extended or adjusted under 35 U.S.C. 154(b) by 410 days.

(21) Appl. No.: 14/558,025

(22) Filed: Dec. 2, 2014

Related U.S. Application Data

(60) Provisional application No. 61/910,654, filed on Dec. 2, 2013.

(51) Int. Cl.
*G06F 17/30* (2006.01)

(52) U.S. Cl.
CPC .... *G06F 17/3053* (2013.01); *G06F 17/30061* (2013.01); *G06F 17/30864* (2013.01)

(58) Field of Classification Search
CPC ......... G06F 17/30864; G06F 17/30867; G06F 17/30241; G06Q 10/10
USPC ................................................ 707/748, 758
See application file for complete search history.

(56) References Cited

U.S. PATENT DOCUMENTS

| 1,079,759 | A1 | 7/2010 | Zheng et al. |
| 8,060,510 | B2 | 11/2011 | Ghanekar et al. |
| 8,239,130 | B1 * | 8/2012 | Upstill et al. ................. 701/426 |
| 8,538,973 | B1 | 9/2013 | Gonzalez et al. |
| 2008/0010273 | A1 * | 1/2008 | Frank ............................... 707/5 |
| 2015/0177017 | A1 * | 6/2015 | Jones ........................... 707/756 |

OTHER PUBLICATIONS

Peng Liang et al., A new image matching algorithm based on scale adapted interest point detection, 2009, IEEE, 393-398.*
Zhou et al., "Discovering personally Meaningful Places: An Interactive Clustering Approach", ACM Transactions on Information Systems, vol. 25, No. 3, Article 12, Jul. 2007, 31 pages.

* cited by examiner

*Primary Examiner* — Jean B Fleurantin
(74) *Attorney, Agent, or Firm* — Dority & Manning, P.A.

(57) ABSTRACT

Systems and methods for identifying and eliminating outlying point of interest search results to improve the readability of the mapped results are provided. One exemplary method includes obtaining, by one or more computing devices, a plurality of points of interest. Each point of interest has an associated location. The method includes determining, by the one or more computing devices, a distance score for each of the plurality of points of interest. The method includes determining, by the one or more computing devices, a distance ratio. The distance ratio compares the distance score associated with the point of interest having the distance score of greatest magnitude to the distance score associated with the point of interest having the distance score of second greatest magnitude.

19 Claims, 3 Drawing Sheets

SYSTEMS AND METHODS FOR IDENTIFYING OUTLYING POINT OF INTEREST SEARCH RESULTS

PRIORITY CLAIM

The present application is based on and claims priority to U.S. Provisional Application 61/910,654 having a filing date of Dec. 2, 2013, which is incorporated by reference herein.

FIELD

The present disclosure relates generally to point of interest search results provided by a mapping application or a geographic information system. More particularly, the present disclosure relates to systems and methods for identifying and eliminating outlying point of interest search results to improve the readability of the mapped results.

BACKGROUND

A mapping application or a geographic information system can receive a search query from a user and, in response, provide the user with a map of the results. As an example, the user can search for a particular point of interest or category of point of interest (e.g. "Italian restaurant"). In response, the mapping application can identify Italian restaurants located near to a location associated with the user, such as, for example, the location of the computing device employed by the user, a location included in the search string, or a location currently shown to the user within the mapping application user interface.

Once the search results have been identified, the mapping application can then provide the user with a map indicating the location of each of the identified search results. In particular, in certain mapping applications, the viewport elevation or zoom level of the provided map can be chosen as the minimum elevation or maximum zoom that still encloses or displays all of the identified search results.

However, if the majority of the points of interest identified in response to the search are located closely together except that one or more of the identified points of interest are located a significant distance from the other identified points of interest (e.g. one or more outlying search results), then the provided map can be difficult to read or can be generally less useful. In particular, the map will be undesirably "zoomed-out" such that the points of interest that are located closely together will be bunched together, resulting in overlapping indicators. Due to such overlapping indicators, the user may be unable to resolve the identity or location of the individual points of interest that are located in relatively close proximity.

Outlying point of interest search results can be caused by a number of different situations. As an example, the location data associated with one or more of the points of interest can be incorrect, such that a point of interest that would be a desirable search result if correctly located is improperly attributed to a distant location. As another example, the outlying point of interest may be an excellent result to the corresponding search query, such that it is selected instead of more closely located points of interest. However, at a certain distance, the outlying search result causes such degradation to map quality that its detriments outweigh the benefit of providing it as a search result in response to the search query.

As yet another example, certain mapping applications or geographic information systems can designate a business (or allow a business to designate itself) as a "service-area" business. As an example, a plumber may have a physical office at a particular location, but prefer to designate his location as a service area which covers several regions (e.g. zip codes). When the mapping application provides the service-area business as a search result, it can indicate the business's location as the average of its corresponding service area.

However, for a service-area business that provides service to a significantly large area, the average of such service area can result in an outlying point of interest search result. As an example, a business that specializes in custom leather outerwear may service the entire United States via mail order. Therefore, the average of its service area is generally in the center of the country (e.g. Kansas).

Thus, for a user who searches for "leather outerwear" in Santa Monica, Calif., such business may be a relevant search result, as it closely matches the search string and services California via mail order. In fact, the business may even be located in Santa Monica.

However, presenting the mail order business's average service area location, Kansas, on a map with other search results located in Santa Monica can result in the map being so zoomed-out that the results included in Santa Monica become indistinguishable from one another, thereby limiting the map's utility.

SUMMARY

Aspects and advantages of the present disclosure will be set forth in part in the following description, or may be obvious from the description, or may be learned through practice of embodiments of the present disclosure.

One example aspect of the present disclosure is directed to a method for identifying an outlying point of interest search result. The method includes obtaining, by one or more computing devices, a plurality of points of interest. Each point of interest has an associated location. The method includes determining, by the one or more computing devices, a distance score for each of the plurality of points of interest. The method includes determining, by the one or more computing devices, a distance ratio. The distance ratio compares the distance score associated with the point of interest having the distance score of greatest magnitude to the distance score associated with the point of interest having the distance score of second greatest magnitude. The method includes determining, by the one or more computing devices, whether the distance ratio is greater than a threshold value. The method further includes identifying, by the one or more computing devices, a point of interest having a distance score of greatest magnitude as an outlier when the distance ratio is greater than the threshold value and providing, by the one or more computing devices, a viewport that is sized to include the plurality of points of interest without any identified outlier point of interest.

Other example aspects of the present disclosure are directed to systems, apparatus, tangible, non-transitory computer readable media, and memory devices for identifying an outlying point of interest search result.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling description of the present disclosure, directed to one of ordinary skill in the art, is set forth in the specification, which makes reference to the appended figures, in which.

DETAILED DESCRIPTION

Figure 1:
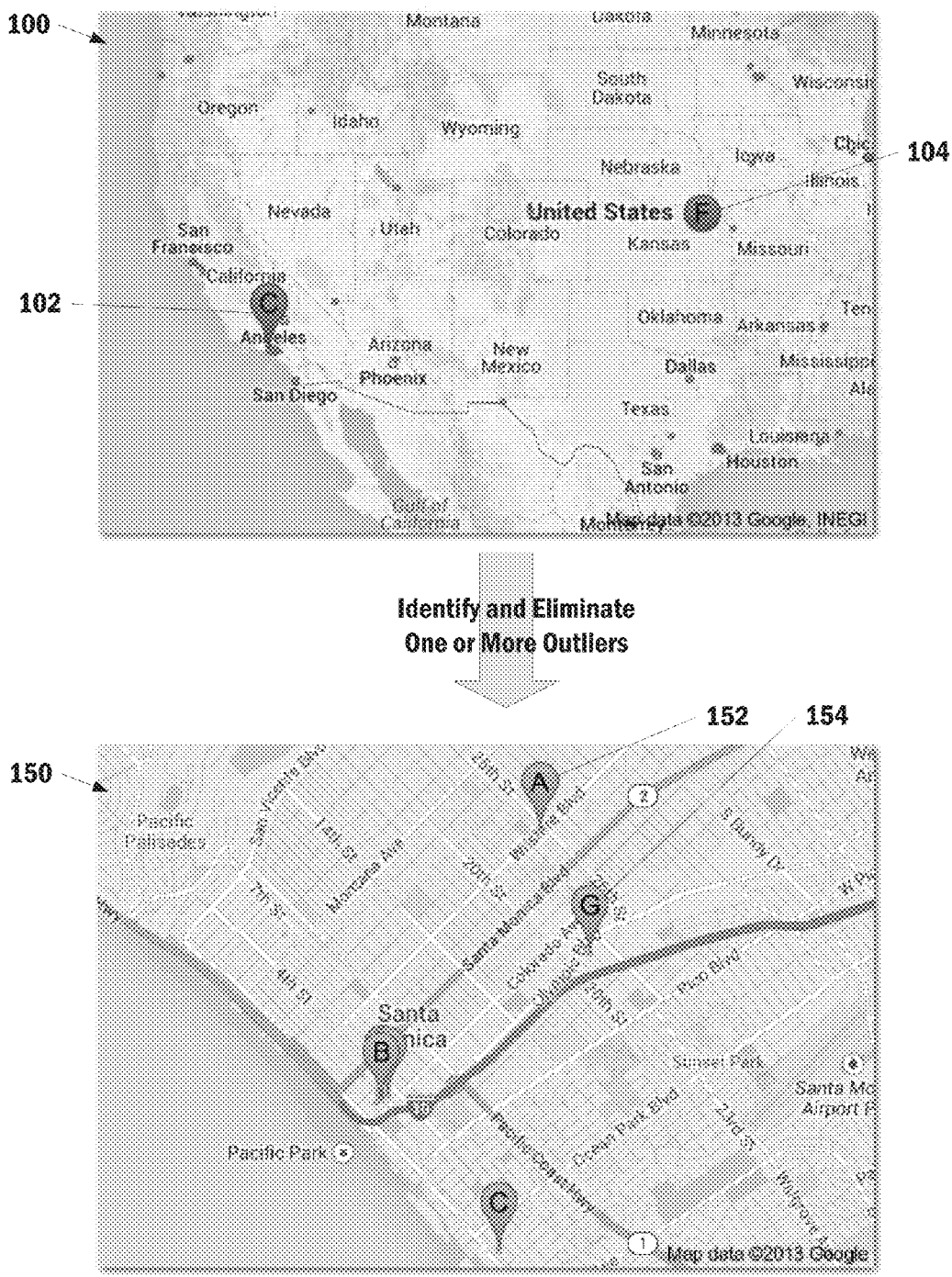
FIG. 1 depicts exemplary maps of point of interest search results according to an exemplary embodiment of the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made to the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

With reference now to the FIGS., exemplary embodiments of the present disclosure will be discussed in further detail. FIG. 1 depicts exemplary maps 100 and 150 of point of interest search results according to an exemplary embodiment of the present disclosure.

Map 100 indicates the respective locations of a plurality of points of interest. For example, indicators 102 and 104 show the respective locations of two points of interest that have been identified in response to a search query. As an example, map 100 can be provided in response to a search for "leather outerwear" in Santa Monica, Calif.

As can be seen with respect to map 100, the point of interest indicated by indicator 104 is located a significant distance away from Santa Monica, Calif., where the majority of the lettered results are located. For example, the business indicated by indicator 104 may be a mail order business providing service to the entire country. Therefore, while relevant to the particular search query, the location associated with the business indicated by indicator 104 may be an outlier with respect to the location of the other lettered search results.

Meanwhile, indicator 102 may be covering or otherwise occluding or preventing presentation of additional lettered results. In particular, such results may be located in such proximity to each other that presentation of additional lettered indicators is undesirable or would render the map unreadable. Thus, while relevant to the search query, presentation of indicator 104 is detrimentally affecting the utility of map 100.

According to an aspect of the present disclosure, one or more outlying point of search results can be identified and can be eliminated or otherwise not displayed in the provided map. As an example, the mail order business indicated by indicator 104 of map 100 can be identified as an outlying point of interest search result. Therefore, an enhanced map that does not provide such outlying point of interest can be provided.

As an example, map 150 indicates the respective locations of a plurality of points of interest identified in response to a search query. For example, indicators 152 and 154 show the respective locations of two points of interest that have been identified in response to the search query.

More particularly, map 150 can be provided in response to the search for "leather outerwear" in Santa Monica, Calif. However, as the mail order business has been identified as an outlier and is therefore not presented, map 150 provides a more useful presentation of the search results. In particular, the particular location and identity of each of the search results can be more easily resolved.

Figure 2:
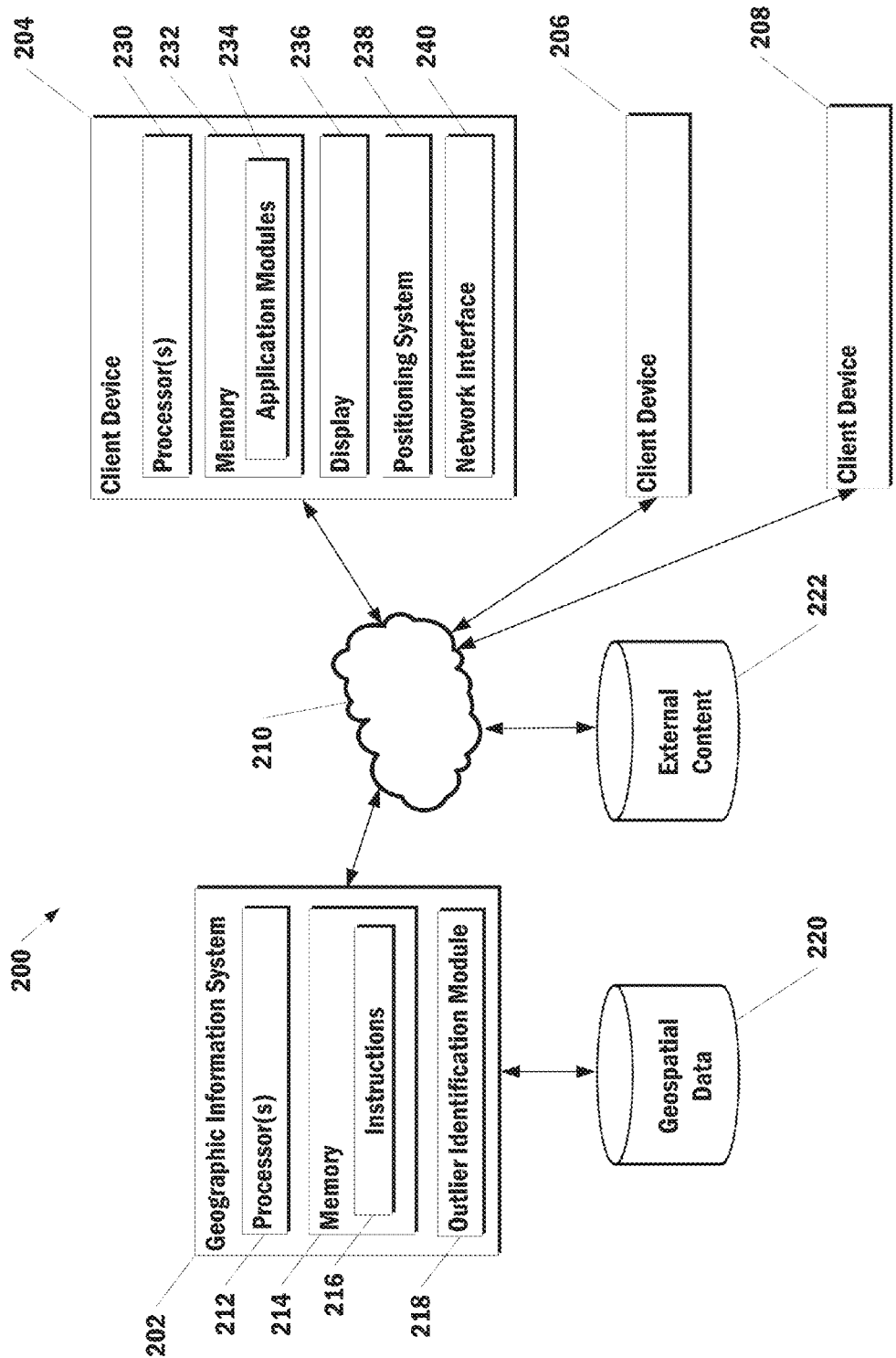
FIG. 2 depicts an exemplary system for providing point of interest search results according to an exemplary embodiment of the present disclosure.

FIG. 2 depicts an exemplary system 200 according to an exemplary embodiment of the present disclosure. System 200 can include a client-server architecture, where a geographic information system 202 communicates with one or more client devices 204, 206, and 208 over a network 210. Although three client devices 204, 206, and 208 are illustrated in FIG. 2, any number of client devices can be connected to geographic information system 202 over network 210.

Client devices 204, 206, and 208 can be, for example, a computing device having a processor 230 and a memory 232, such as a wireless mobile device, a personal digital assistant (PDA), smartphone, tablet, navigation system located in a vehicle, handheld GPS system, laptop computer, desktop computer, computing-enabled watch, computing-enabled eyeglasses, gaming console, embedded computing system, home appliances, or other such devices/systems. In short, client device 204 can be any computer, device, or system that can interact with the geographic information system 202 (sending and receiving data).

Processor 230 of client device 204 can be any suitable processing device and can be one processor or a plurality of processors that are operably connected. Memory 232 can include any number of computer-readable instructions or other stored data. In particular, memory 232 can include, store, or provide one or more application modules 234. When implemented by processor 230, application modules 234 can respectively cause or instruct processor 230 to perform operations consistent with the present disclosure, such as, for example, running an application that transmits data to or receives data from geographic information system 202 in addition to performing any number of arbitrary operations. Application modules 234 can include, for example, a mapping application, a browser application, or a specialized application to interact with and provide data received from geographic information system 202.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example, computer executable instructions that are stored in a tangible computer-readable storage medium such as RAM hard disk or optical or magnetic media.

Client device 204 can further include a positioning system 238. Positioning system 238 can determine a current geographic location of client device 204 and communicate such geographic location to geographic information system 202 over network 210. The positioning system 238 can be any device or circuitry for analyzing the position of the client device 204. For example, the positioning system 238 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

In the instance in which the user consents to the use of positional or location data, the positioning system 238 can analyze the position of the client device 204 as the user moves around in the world and provides the user location information to the geographic information system 202 over network 210. The location of the client device 204 can, in some instances, be used by geographic information system 202 to perform location-specific searches.

Client device 204 can further include a display 236 and a network interface 240. Display 236 can be any component or device for presenting visual information, such as a map or other geospatial data provided to client device 204 by geographic information system 202. Network interface 240 can include any suitable components for interfacing with one more networks, including for example, transmitters, receivers, ports, controllers, antennas, or other suitable components.

Geographic information system 202 can provide for the archiving, retrieving, and manipulation of geospatial data that has been indexed and stored according to geographic coordinates, such as latitude, longitude, and altitude coordinates, associated with the geospatial data. The geographic information system 202 can combine satellite imagery, aerial imagery, panoramic imagery, street level imagery, photographs, maps, three-dimensional models, vector data and other geographic data, and search capability so as to enable a user to view imagery of a geographic area and related geographic information.

In particular, geographic information system 202 can provide functionality such that a user of client device 204 can search for and receive results pertaining to one or more points of interest. As used herein, a "point of interest" refers to any feature, landmark, point of interest, or other object or event associated with a geographic location. For instance, a point of interest can include a business, restaurant, retail outlet, coffee shop, bar, music venue, attraction, museum, theme park, arena, stadium, festival, organization, entity, or other suitable points of interest. Data associated with point of interests can include the name of the point of interest, the location of the point of interest, such as longitude, latitude, and altitude coordinates associated with the point of interest, or other suitable information.

Points of interest can be identified in response to a search query based on location analysis, semantic analysis, popularity analysis, or other factors. Many methods and systems for identifying points of interest in response to a search query and known in the art and can be implemented or performed by geographic information system 202.

In some implementations, geographic information system 202 can further allow the user to conduct local searches and to get travel directions to a location or between two or more locations. Results can be displayed in a two-dimensional (2D), two-and-half dimensional (2.5D), or three-dimensional (3D) representation of the area of interest. The user can pan, tilt, zoom, and rotate the view to navigate a representation of the area of interest or the view can provide an animated tour around the area of interest.

Geographic information system 202 can be implemented using one or more suitable computing devices and can include a processor 212 and a memory 214. Processor 212 can be any suitable processing device and can be one processor or a plurality of processors which are operably connected. Memory 214 can store instructions 216 that cause processor 212 to perform operations to implement the present disclosure. Geographic information system 202 can communicate with client device 204 over network 210 by sending and receiving data.

According to an aspect of the present disclosure, geographic information system 202 can further include an outlier identification module 218. In particular, geographic information system 202 can implement outlier identification module 218 to identify and eliminate one or more outlying point of interest search results to improve the readability of mapped results. In some implementations, outlier identification module 218 can be implemented to perform aspects of method (300) of FIG. 3.

Network 210 can be any type of communications network, such as a local area network (e.g., intranet), wide area network (e.g., Internet), or some combination thereof and can include any number of wired or wireless links. In general, communication between the geographic information system 202 and a client device 204 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Figure 3:
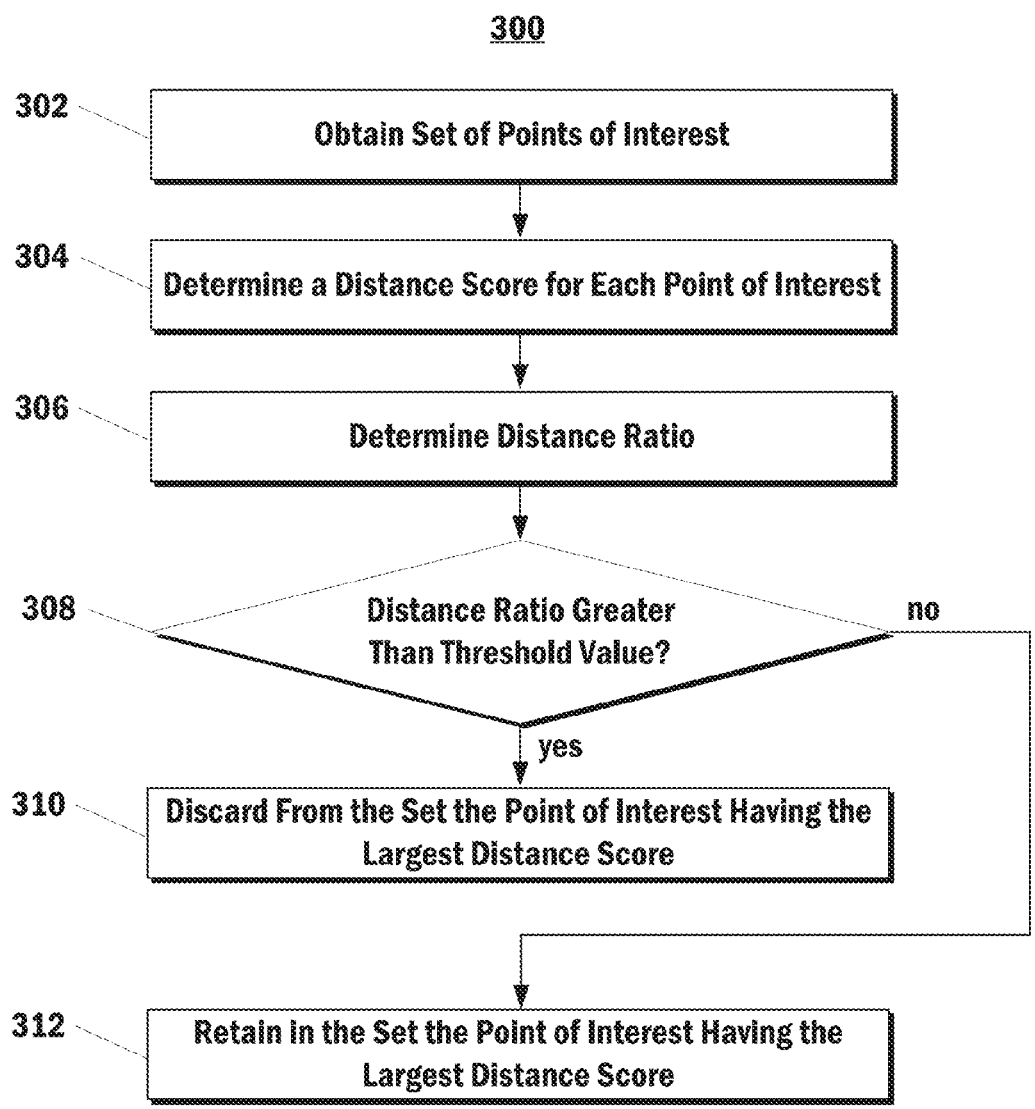
FIG. 3 depicts a flow chart of an exemplary method for identifying outlying point of interest search results according to an exemplary embodiment of the present disclosure.

Geographic information system 202 can be coupled to or in communication with one or more databases, including a geospatial database 220 and external content 222. Although databases 220 and 222 are depicted in FIG. 3 as external to geographic information system 202, one or more of such databases can be included in memory 214 of geographic information system 202. Further, databases 220 and 222 can each correspond to a plurality of databases rather than a single data source.

Geospatial database 220 can store or provide geospatial data to be used by geographic information system 202. Exemplary geospatial data includes geographic imagery (e.g., digital maps, satellite images, aerial photographs, street-level photographs, synthetic models, etc.), tables, vector data (e.g. vector representations of roads, parcels, buildings, etc.), point of interest data, or other suitable geospatial data. Geospatial database 220 can be used by geographic information system 202 to provide navigational directions, perform location-specific point of interest searches, or any other suitable use or task.

Computer-based system 200 can access or direct users to external content 222. External content 222 can be any form of external content including news articles, webpages, video files, audio files, written descriptions, ratings, game content, social media content, photographs, commercial offers, or other suitable external content. Geographic information system 202 and client device 204 can access external content 222 over network 210. External content 222 can be searched by geographic information system 202 according to known searching methods and can be ranked according to relevance, popularity, or other suitable attributes, including location-specific filtering or promotion.

FIG. 3 depicts a flow chart of an exemplary method (300) for identifying outlying point of interest search results according to an exemplary embodiment of the present disclosure. Method (300) can be implemented using any suitable computing system, including, for example, system 200 of FIG. 2.

In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

At (302) a set of points of interest can be obtained. For example, the set of points of interest can have been identified in response to a search query. Each point of interest in the set of points of interest can have an associated location. As an example, the location for each point of interest can include a latitude and a longitude.

At (304) a distance score can be determined for each point of interest. As an example, according to an aspect of the present disclosure, the distance score for each point of interest can be a sum of the distance between such point of interest and each of the other points of interest included in the set of points of interest obtained at (302).

In some implementations, the distance between each pair of points of interest can be a linear Earth distance determined based on the respective latitude and longitude of each point of interest. Thus, in such implementations, the distance score for each point of interest can be determined by iteratively computing, for each point of interest, the sum of the linear Earth distance between such point of interest and each of the other points of interest.

In other implementations, the distance between each pair of points of interest can be an L1 distance. As an example, the latitude and longitude for each point of interest can be considered in Euclidean space and the distance between two points of interest can be the sum of the absolute differences of their coordinates.

In yet other implementations, the distance between each pair of points of interest can be equal to a driving distance or a driving time. Traffic data, modes of transportation, weather, or other variables may or may not be considered.

However, the present disclosure is not limited to the particular formulations provided. Thus, many other factors can be considered when determining the distance score for each point of interest at (304).

At (306) a distance ratio can be determined. As an example, in some implementations, the distance ratio determined at (306) can compare the distance score associated with the point of interest having the distance score of greatest magnitude to the distance score associated with the point of interest having the distance score of second greatest magnitude.

For example, the distance score associated with the point of interest having the distance score of greatest magnitude can be divided by the distance score associated with the point of interest having the distance score of second greatest magnitude to obtain the distance ratio at (306).

Thus, in some implementations, determining the distance ratio at (306) can include ordering the plurality of points of interest into a sequence from distance score of greatest magnitude to distance score of smallest magnitude and then dividing the distance score associated with the first sequential point of interest by the distance score associated with the second sequential point of interest to obtain the distance ratio.

To provide an example, consider the case in which the set of points of interest obtained at (302) includes a number of entries (N). In particular, consider the case in which the set includes a single outlying point of interest with the remainder of the points of interest being closely located.

Thus, the distance between any two of the closely located points of interest is less than some small value (d), while the distance from any of such closely located points of interest to the outlying point of interest is approximately (D), where $D \gg d$.

As such, in the instance that the distance score for each point of interest is the sum of the distances from such point of interest to all other points of interest, the distance score for the outlying point of interest is approximately $(D*(N-1))$. Further, the distance score for each of the closely located points of interest is approximately $(D+(N-2)*d)$.

Continuing the above example situation, in the instance that the distance ratio equals the distance score associated with the point of interest having the distance score of greatest magnitude divided by the distance score associated with the point of interest having the distance score of second greatest magnitude, the distance ratio is approximately $(D*(N-1))/(D+(N-2)*d)$. Further generalizing such distance ratio, the distance ratio can be generally represented as $((N-1)-\Delta)$, where $\Delta$ is a relatively small number when $D \gg d$.

At (308) it can be determined whether the distance ratio is greater than a threshold value. As an example, in some implementations, the threshold value can be equal to a constant value (k) multiplied by the number of points of interest included in the set of points of interest minus one. Thus, the threshold value can equal $(k*(N-1))$. In some implementations, the constant value is chosen where $(0<k<1)$.

More particularly, as discussed above, in certain implementations, the distance ratio can be generally represented as $((N-1)-\Delta)$, where $\Delta$ is a relatively small number when the distance (D) between a single outlying point of interest and all other points of interest is significantly larger than the distance (d) between any two of the other points of interest.

Thus, in such example situation, if the distance ratio approaches $(N-1)$ (e.g. exceeds $(k*(N-1))$), it can be assumed that such disproportionate relationship between distances (D) and (d) is present. Therefore, the point of interest having the distance score of greatest magnitude can be assumed to be an outlier.

If it is determined at (308) that the distance ratio is greater than the threshold value, then method (300) can proceed to (310) and discard from the set the point of interest having the largest distance score. The revised set can then be provided for mapping or display to the user. In such fashion, an outlying point of interest search result can be identified and eliminated or otherwise not presented to the user.

However, if it is determined at (308) that the distance ratio is not greater than the threshold value, then method (300) can proceed to (312) and retain in the set the point of interest having the largest distance score. The complete set can then be provided for mapping or display to the user. In such fashion, search results can remain unaltered when an outlying point of interest does not exist.

Furthermore, according to an aspect of the present disclosure, the constant value (k) can be adjusted to tune the "strictness" with which method (300) identifies outlying points of interest. In particular, using a smaller constant value can result in more frequent identification of outlying points of interest while using a larger constant value can result in less frequent identification of outlying points of interest. In some implementations, the constant value can be equal to 0.85. Generally, however, the selection of the constant value can represent a balancing between map completeness or inclusiveness versus map quality or utility.

In addition, it will be recognized that the present disclosure is not limited to the particular formulations for the distance score, distance ratio, and threshold value provided above. In particular, many various alternative and additional formulations are considered by and included in the present disclosure.

As an example, in some implementations, more than one distance ratio can be calculated. As an example, a distance ratio can be calculated for each point of interest which compares the distance score for such point of interest to an average distance score associated with all the points of interest or all of the other points of interest. For example, the median or mean average can be used. Alternatively, a minimum distance score can be used in place of the average. The distance ratio for each point of interest can then be compared to a threshold value to identify outliers.

As another example, in some implementations, the distance scores for all points of interest can be analyzed to identify one or more significant discontinuities in the range of distance scores. For example, if one or more significant discontinuities exists, then it can be recognized that two or more clusters of results potentially exist.

Therefore, in such situation, further operations may be performed to detect location clusters. If two of more clusters of points of interest are identified, then one exemplary response can be to provide the user with two or more unique maps, so that each cluster of points of interest can be viewed on a map that provides sufficient detail and resolution.

As yet another example, in some implementations, the distance ratio can implement Chauvenet's criterion, assuming a normal distribution of locations around their average. For example, the distance ratio can multiply the probability of achieving the distance score of greatest magnitude by the number of points of interest included in the set. The probability of achieving the distance score of greatest magnitude can be based on the mean and standard deviation associated with the distance scores for all points of interest included in the set. Further, in such implementations, the threshold value can equal one divided by two times the number of points of interest included in the set and the point of interest being considered can be discarded if the distance ratio is less than the threshold value.

In addition, although the present disclosure has been discussed in the context of point of interest search results, it will be recognized that aspect of the present disclosure, such as, for example, method (300) of FIG. 3, can advantageously be applied to other situations concerning various forms of location-associated data.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for identifying an outlying point of interest search result, the method comprising:
    Obtaining, by one or more computing devices, a plurality of points of interest, wherein each of the plurality of points of interest has an associated location;
    determining, by the one or more computing devices, a distance score for each of the plurality of points of interest, wherein the distance score is associated with a distance between the respective point of interest relative to each of the other points of interest;
    determining, by the one or more computing devices, a distance ratio, wherein the distance ratio compares the distance score associated with the point of interest having the distance score of greatest magnitude to the distance score associated with the point of interest having the distance score of second greatest magnitude;
    determining, by the one or more computing devices, whether the distance ratio is greater than a threshold value;
    identifying, by the one or more computing devices, a point of interest having the distance score of greatest magnitude as art outlier when a distance ratio is greater than the threshold value; and
    providing, by the one or more computing devices, a viewport that is sized to include the plurality of points of interest without any identified outlier point of interest.

2. The method of claim 1, wherein obtaining, by the one or more computing devices, the plurality of points of interest comprises identifying, by the one or more computing devices, the plurality of points of interest in response to a search query received in one of a mapping application or a geographic information system.

3. The method of claim 1, wherein the location associated with each of the plurality of points of interest comprises a latitude and a longitude.

4. The method of claim 1, wherein the distance score for each point of interest comprises a sum of the distance between such point of interest and each of the other points of interest.

5. The method of claim 4, wherein the distance between each point of interest and each of the other points of interest comprises a linear Earth distance.

6. The method of claim 4, wherein the distance between each point of interest and each of the other points of interest comprises an L1 distance.

7. The method of claim 4, wherein the distance between each point of interest and each of the other points of interest comprises a distance capable of being driven.

8. The method of claim 1, wherein determining, by the one or more computing devices, the distance ratio comprises dividing, by the one or more computing devices, a distance score associated with a point of interest having a distance score of greatest magnitude by a distance score associated with a point of interest having a distance score of second greatest magnitude.

9. The method of claim 1, wherein determining, by the one or more computing devices, the distance ratio comprises:

ordering, by the one or more computing devices, the plurality of points of interest into a sequence from distance score of greatest magnitude to distance score of smallest magnitude; and dividing, by the one or more computing devices, the distance score associated with the first sequential point of interest by the distance score associated with the second sequential point of interest to obtain the distance ratio.

10. The method of claim 1, wherein the threshold value comprises a constant value times the number of points of interest included in the plurality of points of interest having the 1 subtracted therefrom.

11. The method of claim 10, wherein the constant value is adjustable.

12. The method of claim 1, wherein identifying, by the one or more computing devices, a point of interest having a distance score of greatest magnitude as an outlier when the distance ratio is greater than the threshold value comprises discarding, by the one or more computing devices, a point of interest having a distance score of greatest magnitude from the plurality of points of interest when the distance ratio is greater than the threshold value, such that a second plurality of points of interest is formed.

13. The method of claim 1, further comprising retaining, by the one or more computing devices, a point of interest having a distance score of greatest magnitude when the distance ratio is less than the threshold value.

14. A computing system, comprising:
one or more processors; and
one or more memory devices, the one or more memory devices comprising computer-readable instructions that when executed by the one or more processors cause the one or more processors to perform operations, the operations comprising:
obtaining a plurality of points of interest, wherein each of the plurality of points of interest has an associated location;
determining a distance score for each of the plurality of points of interest, wherein the distance score is associated with a distance between the respective point of interest relative to each of the other points of interest;
determining a distance ratio, wherein the distance ratio compares the distance score associated with the point of interest having the distance score of greatest magnitude to the distance score associated with the point of interest having the distance score of second greatest magnitude;
determining whether the distance ratio is greater than a threshold value;
identifying, by the one or more computing devices, a point of interest having a distance score of greatest magnitude as an outlier when the distance ratio is greater than the threshold value; and
providing a viewport that is sized to include the plurality of points of interest without any identified outlier point of interest.

15. The computing system of claim 14, wherein determining the distance ratio comprises dividing, by the one or more computing devices, the distance score associated with a point of interest having a distance score of greatest magnitude by a distance score associated with a point of interest having a distance score of second greatest magnitude.

16. The computing system of claim 14, wherein the threshold value comprises a constant value times the number of points of interest included in the plurality of points of interest having the 1 subtracted therefrom.

17. The computing system of claim 14, wherein identifying a point of interest having a distance score of greatest magnitude as an outlier when the distance ratio is greater than the threshold value comprises discarding a point of interest having a distance score of greatest magnitude from the plurality of points of interest when the distance ratio is greater than the threshold value, such that a second plurality of points of interest is formed.

18. The computing system of claim 14, further comprising retaining a point of interest having a distance score of greatest magnitude when the distance ratio is less than the threshold value.

19. One or more non-transitory computer-readable media storing instructions that, when executed by one or more processors, cause the one or more processors to perform operations, the operations comprising:
obtaining a plurality of points of interest, wherein each of the plurality of points of interest has an associated location;
determining a distance score for each of the plurality of points of interest, wherein the distance score is associated with a distance between the respective point of interest relative to each of the other points of interest;
determining a distance ratio, wherein the distance ratio compares the distance score associated with the point of interest having the distance score of greatest magnitude to the distance score associated with the point of interest having the distance score of second greatest magnitude;
determining whether the distance ratio is greater than a threshold value;
identifying, by the one or more computing devices, a point of interest having a distance score of greatest magnitude as an outlier when the distance ratio is greater than the threshold value; and
providing a viewport that is sized to include the plurality of points of interest without any identified outlier point of interest.

* * * * *